(12) United States Patent
Bertolotti et al.

(10) Patent No.: US 6,488,849 B2
(45) Date of Patent: Dec. 3, 2002

(54) ROTATING DEVICE FOR CONTINUOUSLY FILTERING A LIQUID SUCH AS A SOLUTION CONTAINING A PRECIPITATE

(75) Inventors: Gérard Bertolotti, Montreuil (FR); Yves Lebiez, Tamerville (FR)

(73) Assignee: Compagnie Generale des Matieres Nucleaires, Velizy-Villacoublay (FR)

( * ) Notice: Subject to any disclaimer, the term of this patent is extended or adjusted under 35 U.S.C. 154(b) by 14 days.

(21) Appl. No.: 09/847,149

(22) Filed: May 2, 2001

(65) Prior Publication Data

US 2001/0054581 A1 Dec. 27, 2001

(30) Foreign Application Priority Data

May 2, 2000 (FR) .............................................. 00 05580

(51) Int. Cl.[7] .............................. B04B 3/00; B04B 7/16; B04B 7/18; B04B 15/06; B04B 15/12
(52) U.S. Cl. .................... 210/360.1; 210/211; 210/212; 210/217; 210/369; 210/377; 210/378; 210/393; 210/394; 210/398; 210/380.3; 494/36
(58) Field of Search ................................. 210/211, 212, 210/217, 360.1, 406, 369, 393, 377, 378, 379, 394, 398, 403, 380.3; 34/58; 494/36

(56) References Cited

U.S. PATENT DOCUMENTS

| | | | |
|---|---|---|---|
| 1,650,434 A | | 11/1927 | Daman |
| 1,851,809 A | | 3/1932 | Carter |
| 1,870,442 A | | 8/1932 | Coley |
| 3,007,575 A | | 11/1961 | Sylvest |
| 3,448,859 A | * | 6/1969 | Hall et al. |
| 3,864,256 A | * | 2/1975 | Hultsch et al. |
| 4,808,308 A | * | 2/1989 | Flory |
| 4,915,851 A | * | 4/1990 | Flory |
| 5,326,471 A | | 7/1994 | Pietzsch |

FOREIGN PATENT DOCUMENTS

| | | |
|---|---|---|
| DE | 461 491 | 5/1928 |
| EP | 0 126653 A1 | 11/1984 |
| NL | 86000793 | 10/1987 |

OTHER PUBLICATIONS

Preliminary Search Report, 1 pg., dated Jan. 30, 2001, in French.
Annex to Preliminary Search Report, 1 pg., dated Jan. 30, 2001, in French.

* cited by examiner

Primary Examiner—Thomas M. Lithgow
(74) Attorney, Agent, or Firm—Cohen, Pontani, Lieberman & Pavane

(57) ABSTRACT

The present invention relates to a rotating device for continuously filtering a liquid such as a solution containing a precipitate.

According to this invention, the device comprises a cylindrical, horizontal-axis drum of revolution, rotated by a drive system, a plurality of filtering elements each disposed axially, forming at least a part of the cylindrical wall of the drum, said filtering elements each being connected to a process conduit, a system for supplying liquid to be filtered, opening via said opening inside said drum, a system for evacuating the cake, a system for evacuating the filtrate passing through said process conduits, a hydraulic supply assembly comprising a pulsed compressed air supply and means forcing the passage of said liquid through the filtering elements, said supply assembly being adapted to communicate with said process conduits by a connecting system allowing an angular distribution of the operations effected by said device, these operations comprising at least the filtration of the liquid and the separation of the cake from said filtering elements by cleaning.

16 Claims, 7 Drawing Sheets

ROTATING DEVICE FOR CONTINUOUSLY FILTERING A LIQUID SUCH AS A SOLUTION CONTAINING A PRECIPITATE

FIELD OF THE INVENTION

The present invention relates to a rotating device for continuously filtering a liquid such as a solution containing a precipitate.

BACKGROUND OF THE INVENTION

In numerous cases, there is in fact a need to filter a slurry, a suspension or a precipitate in order to separate the solid matters from the liquid matters.

To that end, a certain number of filtration devices for effecting such a separation, particularly continuously, have already been proposed, the product to be filtered arriving in the device via an inlet, the liquid and the solid matters, these two products being separated from each other, being collected at the outlet of the device.

For example, filtration devices are known, which comprise a cylindrical, horizontal-axis drum of revolution, rotated by a drive system, said drum having a rectangular longitudinal section with a vertical wall, a cylindrical wall and an axial opening defined by an annular flange extending the cylindrical wall, a plurality of filtering elements each disposed axially, forming at least a part of the cylindrical wall of the drum, said filtering elements each being connected to a process conduit.

Such devices also comprise a system for supplying liquid to be filtered, entering via said opening inside said drum, a system for evacuating the cake (solid matters), a system for evacuating the filtrate passing through said process conduits, a hydraulic supply assembly comprising a pulsed compressed air supply and means forcing the passage of said liquid through the filtering elements, said supply assembly being adapted to communicate with said process conduits by a connecting system allowing an angular distribution of the operations effected by said device, these operations comprising at least the filtration of the liquid and the separation of the cake from said filtering elements by cleaning.

However, such filtration devices present a large number of drawbacks. In particular, the continuous filtration devices of the prior art present a complicated structure which does not allow easy maintenance of this device.

It is an object of the invention to provide a rotating continuous-filtration device which does not present the drawbacks of the prior art and which presents a compact, reliable structure easy to maintain, access to the elements to be checked or changed being simplified.

SUMMARY OF THE INVENTION

To that end, the invention relates to a filtration device of the type mentioned hereinbefore, wherein said drive system comprises a drive shaft coaxial and fast with said drum at the level of said vertical wall located on the side of the drum opposite said opening, wherein said means forcing the passage of said liquid through the filtering elements comprise a source of depression for filtration connected to said system for evacuation of the filtrate and placing the interior of said filtering elements under depression with respect to the interior of the drum, wherein said system for evacuating the cake functions by gravity and presents a collecting hopper located inside the drum substantially beneath the uppermost part and connected to a spout extending out of the drum via said opening, wherein said process conduits extend in said vertical wall of the drum and present, on the one hand, a first end opening out in a filtering element and, on the other hand, a second end opening out in the outer vertical face of said vertical wall, and wherein said connecting system comprises a first disc (plate) fast with the drum about the drive shaft and pierced with a plurality of connection openings which are connected one by one to the second ends of said process conduits, and a second fixed disc (counter-plate) coaxial with and adjacent said first disc and provided with angular slots in register with said supply assembly and disposed radially opposite said connection openings, an angular filtration slot being located at least partially in the lower part of the second disc and connected to said source of depression for the filtration of the liquid, and an angular cleaning slot being located substantially in the uppermost angular sector of the second disc and connected to said compressed air supply for the separation of the cake from each filtering element.

It is thus understood that the filtration of the liquid from the interior of the drum towards the outside of the drum via the filtering elements, thanks to a source of depression for filtration placing the interior of the filtering elements under depression with respect to the interior of the drum, makes it possible to produce a reduced filtration circuit guaranteeing the passage of the liquid in the filtering elements. In addition, by using a connecting system with a first disc, or plate, which is mobile in rotation, and a second disc, or counter-plate, which is fixed, an angular distribution of the different functions of the device at the level of a very compact structure is reliably obtained.

In order to improve the facility of maintenance of the filtration device according to the invention, the following advantageous arrangements are provided:

- the cylindrical wall of the drum is provided with supports each oriented axially and distributed radially in regularly spaced manner, each filtering element being removably mounted on said supports in order to line the whole cylindrical wall;
- each filtering element is mounted to slide axially with respect to the supports and comprises a base, or shoe, defining a flow cavity covered, in the radially internal direction, by a filter gauze, the bottom of the cavity being inclined towards an opening for evacuation connected to the first end of the process conduit;
- the drum comprises reversible blocking means for blocking each filtering element with respect to the supports;
- the blocking means are adapted to place the filtering elements in radial abutment against the supports in the direction of the horizontal axis.

Furthermore, the liquid supply system is provided to comprise a distributor which allows a substantially homogeneous distribution of the liquid to be filtered over the whole length of the filtering elements, parallel to the axis of the drum.

It will therefore be understood that it is in that case possible to effect maintenance of each filtering element independently of one another, whether for replacement or cleaning purposes.

According to other advantageous arrangements, said supply assembly also comprises:

- a source of depression for drying which generates a depression greater than the depression furnished by said source of depression for filtration and which is connected to the system for evacuating the filtrate, said second disc further comprising an angular slot for drying disposed between the angular slot for filtration and the angular slot for cleaning, and connected to said source of depression for drying;

a supply of washing solution for the cake opening out via said opening in the drum at the level of a rinsing nozzle adapted to direct the jet in the direction of at least one filtering element located radially opposite said angular slot for drying;

a supply of washing solution for the filtering elements, connected to an angular slot for washing of the second disc, said angular slot for washing being located between the angular slot for cleaning and the angular slot for filtration, in order to allow, outside the periods of filtration, the cleaning of the filtering elements by the passage of said washing solution from the process conduits through the angular slot for washing in the direction of the corresponding filtering elements, this circulation of liquid being effected in counter-flow with respect to the filtration step.

According to other advantageous configurations of the filtration device in accordance with the present invention, this device also comprises:

a system for applying said second disc against the first disc;

a sealing disc placed coaxially against the second disc on the side opposite the first disc, the sealing disc being extended axially by a centering sleeve disposed between said drive shaft and the second disc, said second disc resting on the free end of the centering sleeve forming ball and socket joint and having the form of an annular portion of sphere, O-ring joints being placed between the sealing disc and the drive shaft.

The filtration device according to the present invention is particularly designed for the filtration of a liquid requiring handling precautions avoiding any contact with an operator, for example for a dangerous liquid, in particular in the nuclear industry.

To that end, the drum is preferably provided to be placed in an outer vessel recovering the liquid possibly overflowing from the drum via said opening into said vessel in the direction of a pipe for emptying the vessel. The vessel is preferably mounted in an outer glove box allowing access to the filtering elements with a view to replacement thereof. The filtration device preferably further comprises means for displacing the drum which, outside the periods of filtration, make it possible to position at least certain of said filtering elements opposite at least one glove of the glove box.

The filtration device according to the present invention is thus particularly suitable for reprocessing liquids and solid products issuing from the nuclear industry, the device being intended in particular for the filtration of a precipitate of plutonium oxalate in an acid solution, the geometry of the filter in that case being subcritical. In that case, the solution for washing the cake preferably includes nitric acid.

BRIEF DESCRIPTION OF THE DRAWINGS

The invention will be more readily understood and secondary characteristics and advantages thereof will appear from the description of an embodiment given hereinafter by way of indicative and non-limiting example. Reference will be made to the likewise non-limiting drawings in which.

DESCRIPTION OF PREFERRED EMBODIMENT

Figure 1:
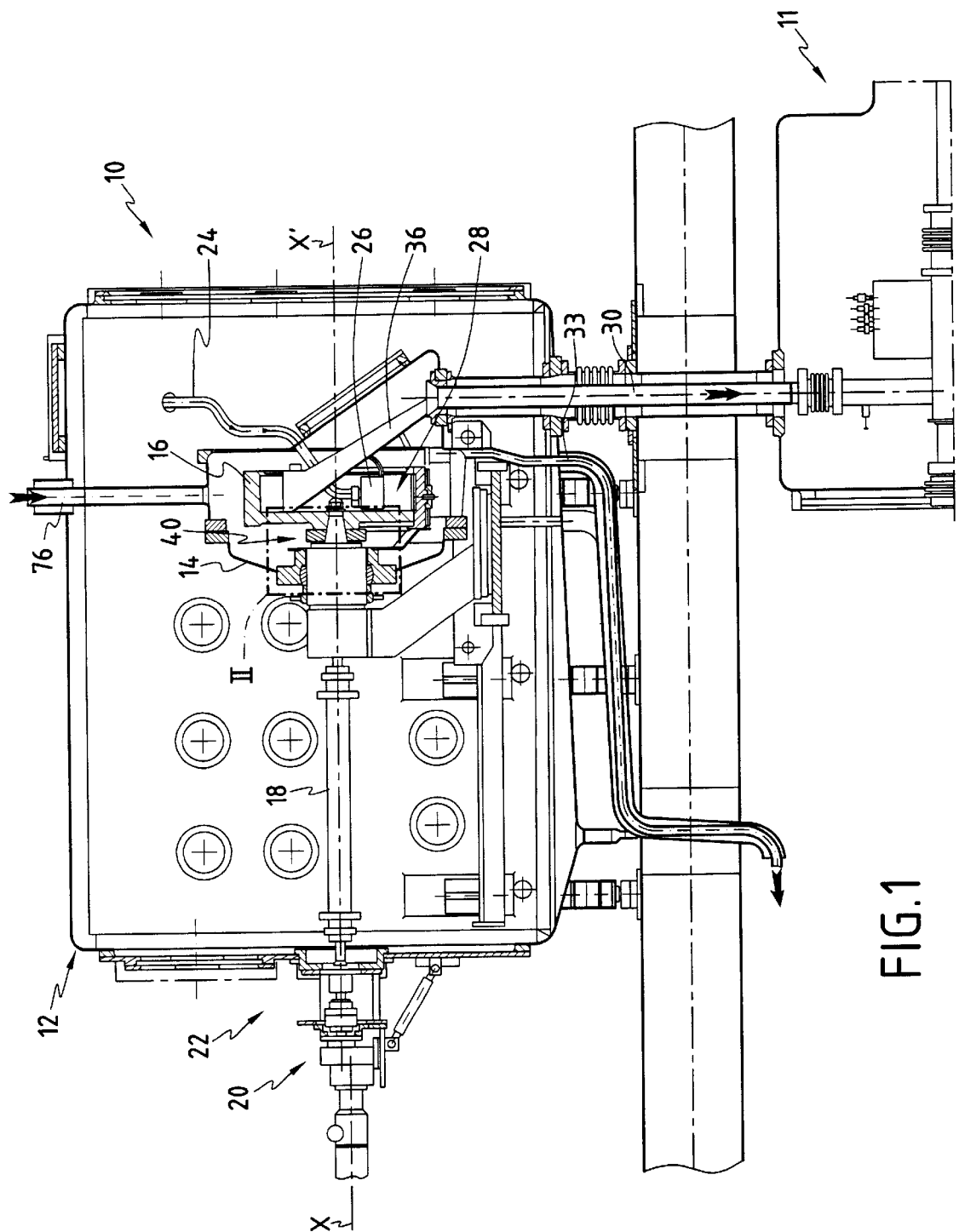
FIG. 1 is a view in longitudinal section of the filtration device according to the present invention.

Referring now to the drawings, FIG. 1 shows the filtration device 10 according to the present invention, intended to effect continuous filtration, washing and drying in vacuo of a precipitate of plutonium oxalate. This filtration device forms part of a chain for reprocessing products of the nuclear industry. For example, this filtration device 10 is located downstream of an oxalate precipitator which generates a precipation liquor arriving at the inlet of the filtration device and including plutonium in an acid medium composing the mother liquor.

The filtration device is located upstream of a drying and calcining furnace 11 intended for treating the cake, i.e. the solid product obtained by the filtration device by separating, within the precipitate, the mother liquor (or filtrate) from a solid matter forming the cake and constituted by pulp of plutonium oxalate.

It is obvious that all the filtration device presents a subcritical geometry guaranteeing safety of the whole installation.

The filtration device 10 is essentially included in a glove box 12 forming an enclosure which enables the filtration device to be insulated from the outside.

There emerge from this glove box 12 only the pipes for admission and for outlet of the different products intervening during filtration, as well as the motorization elements of the filter.

In order to complete the seal and insulation ensured by the glove box, a vessel 14 contains the drum 16 in which filtration is effected. A double containment of the filtration device is thus ensured.

The drum 16 is mounted to rotate about a horizontal axis X—X' by means of a drive shaft 18 forming, with the motorization assembly 20, a drive system 22.

The afore-mentioned assembly of pipes also penetrates at the level of the vessel 14. The following are visible in FIG. 1:

pipe 24 for admission of the precipitate of plutonium oxalate which, with a distributor 26, forms a system 28 for supplying liquid to be filtered, the cake evacuating pipe 30 which functions by gravity is disposed beneath a cake-collecting hopper 36 and is connected to the drying and calcining furnace 11 located below the glove box 12, and the pipe 32 for emptying the vessel 14, this pipe 32 being visible in FIG. 4.

There is naturally also a pipe 33 for evacuating the overflow of the vessel 14. The opening of this pipe 33 being located at a level higher than pipe 32, it becomes useful when pipe 32 is blocked.

Inside the vessel 14 are essentially distinguished the drum 16, the aforementioned supply system 28, the cake-collecting hopper 36 and the aforementioned distributor 26, these two elements opening out inside the drum 16, and a hydraulic connecting system 40 allowing the circulation of the different liquids and gases necessary for carrying out the different functions performed by the filtration device 10, as will be described hereinafter.

Figure 3:
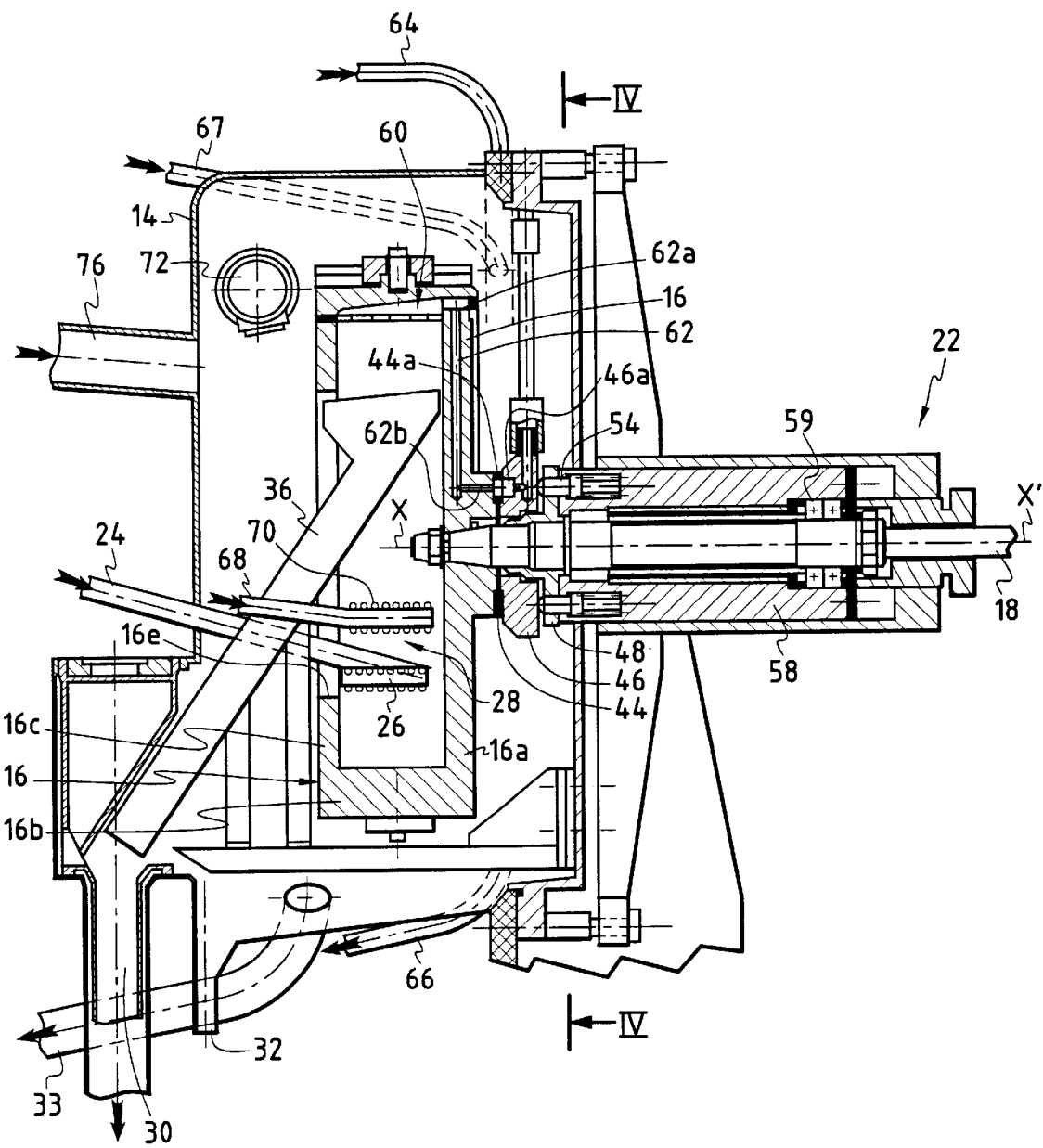
FIG. 3 is a schematic view in longitudinal section of the filtration device according to the invention in direction III—III of FIG. 4.

As may be seen in FIGS. 1 and 3, the drum 16 presents the form of a C in axial section and is composed of a vertical wall 16a adjacent the drive system 22, of a cylindrical wall of revolution 16b and of a vertical annular flange 16c defining an axial opening 16e.

It is via this axial opening 16e that the pipe 24 supplying plutonium oxalate and the cake-collecting hopper 36 penetrate.

It should be noted that the filtration device according to the present invention enables different functions to be performed, namely:

the filtration proper, i.e. the separation between the mother liquor and the solid forming the cake,
the drying of this cake, and
the cleaning of the filtering part and the transfer of the solid matter, namely the cake, towards the pipe 30 leading to the calcining furnace 11.

Figure 2:
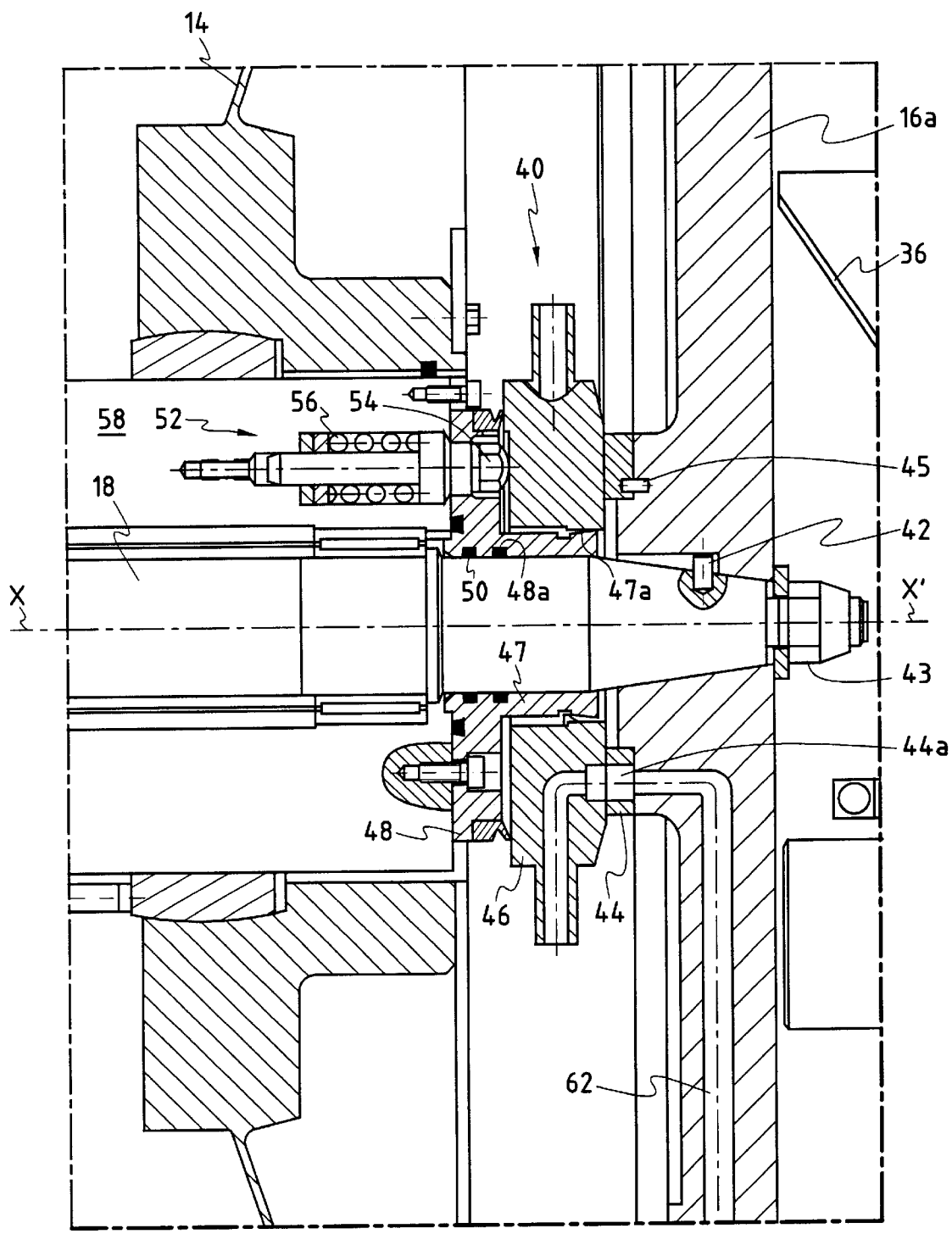
FIG. 2 is a partial enlarged view of detail II of FIG. 1 in section along the horizontal axis of the filtration device.

Reference will now be made to FIG. 2 which illustrates the mechanical assembly of the drive shaft 18 on the drum 16 as well as the connecting system 40. The vertical wall 16a of the drum 16 is pierced at its center in order to receive the end of the drive shaft 18, a key 42 preventing any relative movement between the drum 16 and the drive shaft 18 which are fast with each other.

The end of the drive shaft 18 is mounted in the vertical wall 16a of the drum at the level of a conical shank terminating in a nut 43.

Behind the vertical wall 16a and around the drive shaft 18 is located the connecting system 40 composed of a first disc 44, also called plate, which is mobile in rotation, and of a second disc 46, also called counter-plate, which is fixed.

The first disc 44 is located outside the drum 16 directly against the rear face of the vertical wall 16a and is sandwiched between this vertical wall 16a and the second disc 46, the two discs 44 and 46 being coaxial and centered about the drive shaft 18.

The first disc 44 is mobile in rotation about the drive shaft 18, the first disc 44 being rendered fast with the drum 16 by means of a series of keys 45.

The second disc 46 is fixed and mounted around a centering sleeve 47 extended, in the direction opposite the drum 16, in a seal-bearing disc 48.

The seal-bearing disc 48 presents annular grooves 48a along the radially internal surface in contact with the drive shaft 18, each of these grooves 48a being intended to house an O-ring joint 50 ensuring tightness of the connecting system 40.

The single part constituting the seal-bearing disc 48 and the centering sleeve 47 is also fixed, the contact of the second disc 46 on the centering sleeve 47 being effected at the level of the free end part of the centering sleeve which comprises an outer surface in the form of an annular portion of sphere 47a, this shape constituting a ball and socket fit allowing all angular deformation to be absorbed.

In addition, a pushing system 52 is provided, allowing the second disc 46 to be applied in abutment against the first disc 44. This pushing system 52, visible in FIG. 2, comprises four fingers 54 acting in thrust on the rear face of the second disc 46. These fingers 54 are maintained in abutment on the second disc 46 by means of a compression spring 56.

The second disc 46 is preferably made of stainless steel and the first disc 44, forming expendable part, is made of PTFE ("Teflon" ™).

The pushing system 52 is housed inside a support 58 surrounding the drive shaft 18 in its part adjacent the drum 16.

Bearings 59, visible in FIG. 3, allow the rotation of the drive shaft in the support 58 while ensuring centering and taking up of the efforts.

The role and function of the connecting system 40 composed of the first disc 44 and the second disc 46 will now be described with reference to FIG. 3.

The passage of different liquids and gases between the interior of the drum 16 and the outside of this drum is effected via a circuit visible in FIG. 3 and comprising a filtering element 60 in communication with the interior of the drum 16, a process conduit 62 radially traversing the vertical wall 16a of the drum then extending axially in the direction of the first disc 44, a connection opening 44a axially traversing the first disc, an angular slot 46a opening out, on the one hand, in that face of the second disc turned towards the first disc being capable of lying opposite the afore-mentioned connection opening 44a, and, on the other hand, opening out radially outside the second disc 46 at the level of one of the supply pipes of a hydraulic supply assembly.

Figure 5:
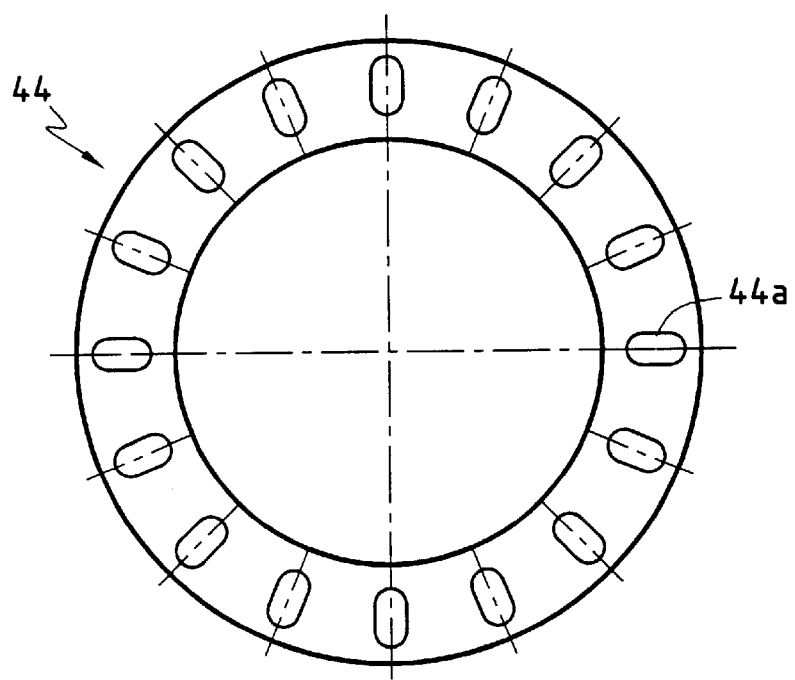
FIG. 5 is a view in the transverse direction of the first disc or plate of the connecting system.

The cylindrical wall 16b of the drum 16 is, in the embodiment illustrated, provided with sixteen filtering elements 60, each in fluid communication with a process conduit 62. Thus, the first end 62a of each process conduit 62 opens out in a filtering element 60 and the second end 62b of each process conduit 62 opens out on the rear face of the vertical wall 16a of the drum facing the first disc 44. As may be seen in FIG. 5, the first disc 44 forms, in fact, a ring provided with sixteen connection openings 44a regularly distributed radially and traversing the first disc 44 axially. These connection openings 44a present, in transverse direction, an oval or oblong shape.

The first disc 44 being mobile in rotation about the drive shaft 18 and fast with the drum 16, each of the connection openings 44a extends, in fact, the second end 62b of one of the process conduits 62.

Figure 6:
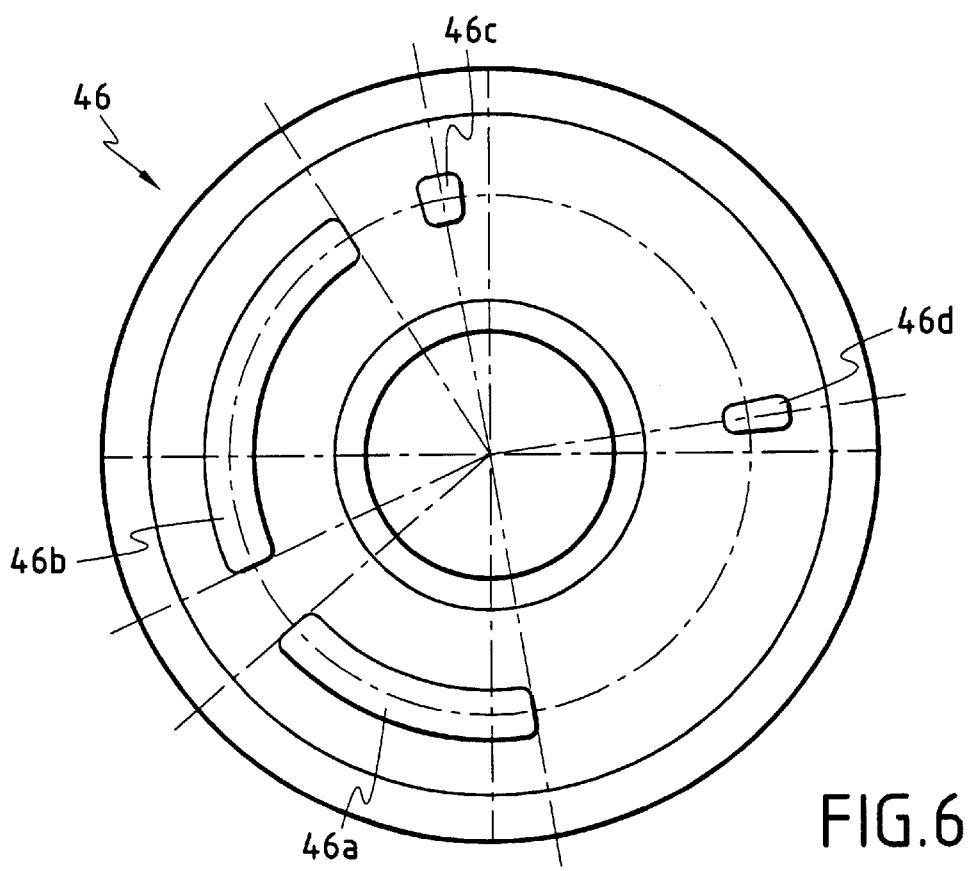
FIG. 6 is a transverse view of the second disc or counter-plate of the connecting system.

Referring now to FIG. 6, the second disc 46 is a ring provided with four angular slots 46a to 46d located at a distance from the center of the second disc 46 equal to the distance separating the center of the first disc 44 from each of the connection openings 46a.

Figure 4:
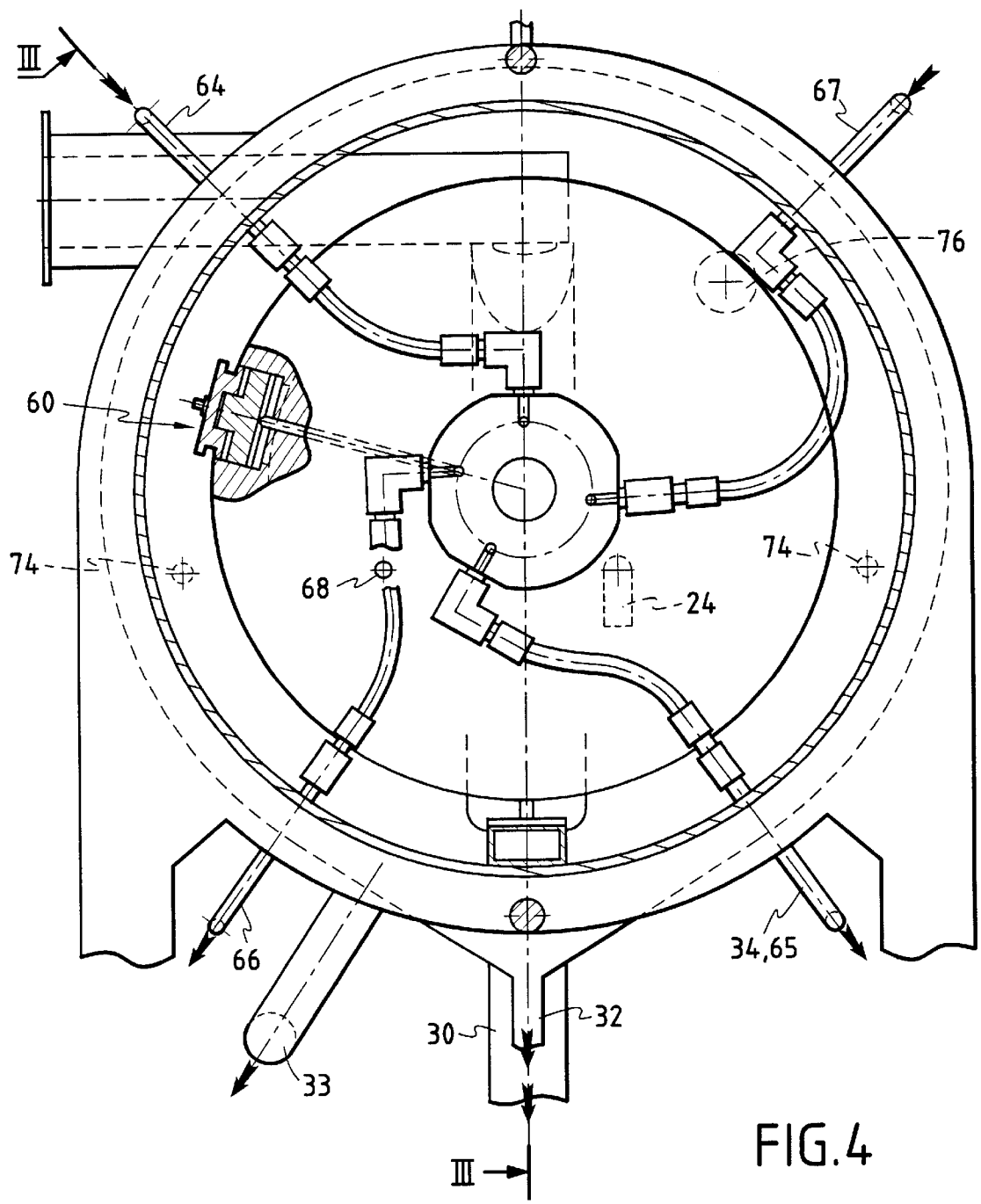
FIG. 4 is a view in transverse section of the filtration device in direction IV—IV of FIG. 3.

The four angular slots 46a to 46d are connected, as may be seen in FIG. 4, to a hydraulic supply assembly comprising four supply pipes 64, 65, 66, 67. Each of these pipes is intended to supply or evacuate a fluid towards the filtering element or from the filtering element 60 which, itself, will be in register via the first disc 44.

Thus, the angular filtration slot 46a located in the lower part of the second disc 46 is connected to a source of depression 65 for filtration (by way of example, the depression is, with respect to atmospheric pressure, $P = -4$ m of water column or $P = -4.10^4$ Pa) constituted by the same conduit as the pipe 34 for evacuating the filtrate. This angular filtration slot 46a extends over about 60° from the lower part of the second disc 46 towards the left in FIG. 6.

An angular slot 46b for drying is offset by about 15° clockwise from the angular filtration slot and extends over about 80°. This angular drying slot 46b is connected to a source 66 of depression for drying. The depression for drying is, in absolute value, greater than the depression for filtration. By way of example, the depression is for example, with respect to atmospheric pressure, P=−6.5 m of water column or P=−6.5.10$^4$ Pa. In addition, the source of depression for drying is connected to the system for evacuating the filtrate, via the pipe 34.

In order to complete the reprocessing of the oxalate precipitate at the level of the angular drying slot 46b, it is also provided to wash the cake substantially at the level of this angular drying slot 46b. To that end, the device is also provided with a source 68 of solution for washing the cake (cf. FIG. 3) opening out in the drum 16 via its opening and terminating in a rinsing nozzle 70 facing the direction of the angular sector of the cylindrical wall 16b corresponding to the angular sector of the angular drying slot 46b.

The second disc 46 is also provided with an angular slot 46c for cleaning located at about 20° clockwise from the angular drying slot 46b, this angular cleaning slot 46c in any case being located in the uppermost angular sector of the second disc.

This angular cleaning slot 46c presents dimensions substantially similar to the dimensions of the connection openings 44a. Moreover, this angular cleaning slot 46c is connected to a compressed air supply 64 which is capable of supplying pulsed compressed air towards the filtering element 60 located in the uppermost angular zone of the drum 16 in order to drive out the cake which is formed on this filtering element 60.

This cake issuing from the upper filtering element 60 illustrated in FIG. 3 is then collected by gravity at the level of the hopper 36 in the direction of the cake evacuation pipe 30 which communicates with the calcining furnace 11 which subsequently processes this cake.

The filtration device 10 is also provided with equipment allowing it to be maintained during operation or outside the periods of use. A camera 72 (cf. FIG. 3) is thus located in the vessel 14 in order to visualize the opening 16e of the drum 16 and in particular to detect an overflow beyond the annular flange 16c.

In addition, it must be possible to clean the drum 16, in particular the filtering elements 60, as well as the vessel 14, outside the operational campaigns of the device 10. To that end, the second disc 46 comprises an angular slot 46d for washing, presenting dimensions similar to the dimensions of the connection openings 44a and located between the angular cleaning slot 46c and the angular filtration slot 46a substantially at equal distance from these two angular slots 46a and 46c in the angular zone of the second disc 46 located most to the right in FIG. 6. This angular washing slot 46d, also visible in FIG. 4, is connected to a supply 67 of washing solution for the filtering elements, this solution including nitric acid.

In addition, in order to clean the vessel 14, cleaning pipes 74 (cf. FIG. 4) open out into the vessel 14 about half way up on either side of the drum 16.

During cleaning of the vessel 14, the cleaning liquid arriving via the cleaning pipes 74 spreads in the vessel and is then evacuated at the level of the vessel emptying pipe 32. The pipe, 33 allows evacuation of the liquids overflowing from the vessel 14, in the event of the vessel emptying pipe 32 being blocked or saturated.

The vessel 14 whose interior is under slight depression, is connected to a ventilation network at the level of a pipe 76 which forms a vent allowing an air inlet. This air inlet makes it possible in particular to compensate the depression created in the drum 16 by the sources of depression 65 and 66, by supplying the gaseous flux created by this depression. One possibility consists in using recycled air coming from the installation.

Figure 7:
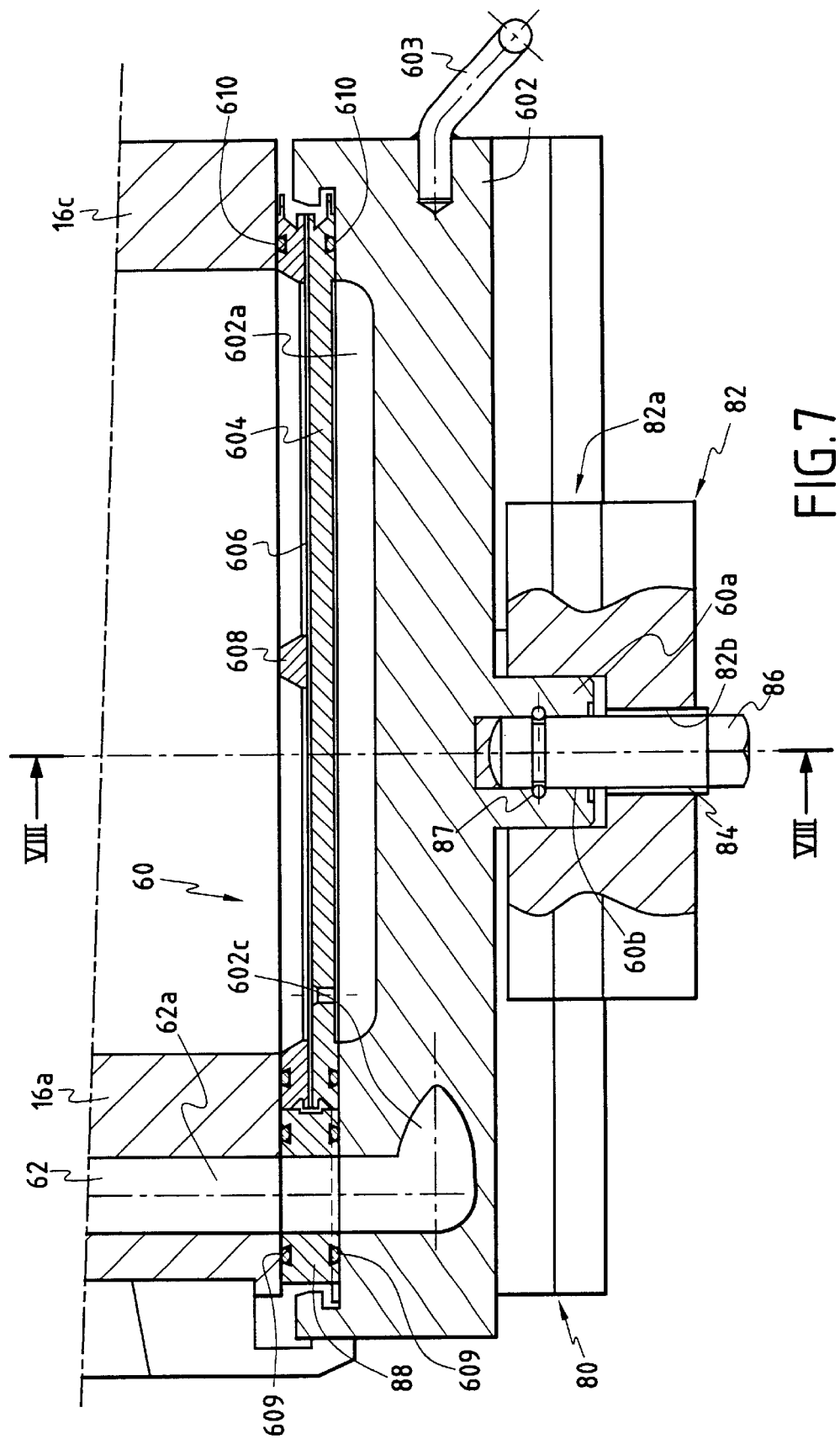
FIG. 7 is a partial view in longitudinal section in direction VII—VII of FIG. 8, of a filtering element mounted on the drum.

The filtering elements 60 disposed along the cylindrical wall 16b of the drum 16 and which constitute one of the advantageous arrangements of the invention, will now be described in connection with FIGS. 7 and 8 which show them in greater detail.

The filtering elements 60, sixteen in number in the embodiment described and illustrated, are disposed axially at the level of the cylindrical wall 16b of the drum of which they essentially constitute the inner face. To that end, the filtering elements 60 are mounted like drawers sliding axially on the drum 16 with the result that they are removable and very easily interchangeable.

Figure 8:
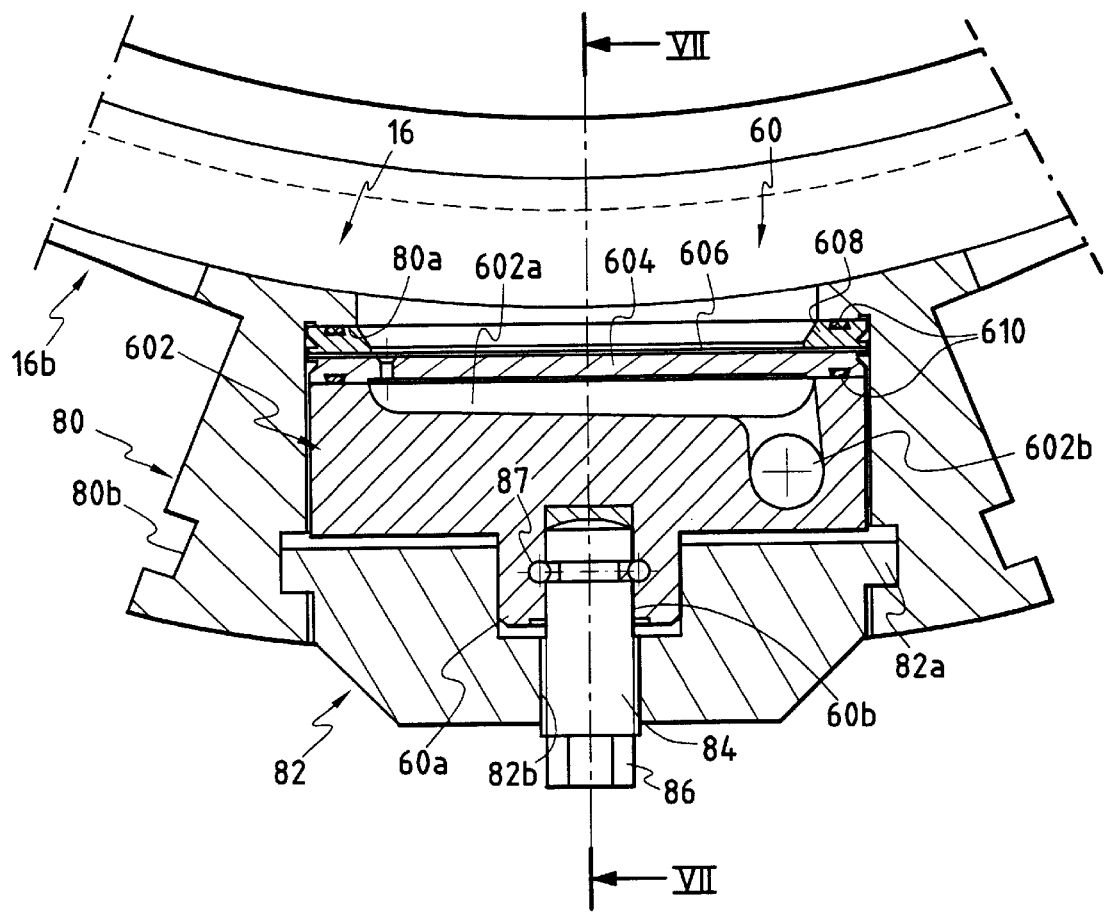
FIG. 8 is a view in transverse section in direction VIII of FIG. 7 of a filtering element mounted between two supports of the drum.

With reference to FIG. 8, the cylindrical wall 16b of the drum 16 comprises supports 80 disposed axially over their larger length, the transverse section of these supports extending radially and presenting the form of two Ts located in line with each other and of which the free ends of the foot are placed end to end.

A filtering element 60 is mounted to slide between two supports 80, element 60 being compressed at the level of a first shoulder 80a of the supports 80 as will be explained hereinbelow.

In order to apply the essentially parallelepipedic filtering element 60 in abutment against the first shoulder 80a, blocking means are provided which make it possible to apply a force of abutment of the filtering element 60 against the support 80.

With reference to FIG. 8, these blocking means comprise a stirrup element 82 disposed axially between two supports 80 in radially outward direction with respect to the element 60, the lateral edges 82a of the stirrup engaging, with a possibility of radial clearance, in axial assembly grooves 80b in the supports 80. This axial assembly groove 80b thus forms a guide rail allowing the lateral edges 82a of the stirrup to slide while radially retaining the stirrup 82 and the filtering element 60 with which it is mounted.

The transverse section of the stirrup 82 is U-shaped, the two arms of the U being located on either side of the rear part of the filtering element composed of an axial rib 60a provided with a radial bore 60b.

The base of the U of the stirrup 82 is provided with a radial tapped hole 82b capable of lying in line with the bore 60b of the filtering element. A locking screw 84 tightened by its nut-shaped head 86 penetrates in the tapped hole 82b and in the bore 60b. The portion of the screw adjacent its head 86 is threaded in order to cooperate with the tapped hole 82b.

The radial abutment of the free end of the screw opposite the head 86 against the bottom of the bore 60b (provided with an abutment piece in FIGS. 7 and 8) and the cooperation between the thread of the screw 84 and the tapped hole 82b allow the filtering element to be blocked.

Such blocking is effected by rotating the head 86 of the screw 84 which brings about a separation between the filtering element 60 and the stirrup 82 as the screw 84 penetrates in the tapped hole 82b and up to the moment when the lateral edges 82a of the stirrup are blocked radially against a radially outer bearing face of the axial assembly grooves 80b.

A retaining seal 87 captive in a first annular groove opening out in the bore 60b and in a second annular groove formed in the smooth face of the screw 84, renders the screw 84 and a base 602 fast.

Thus, in blocked position, the filtering element 60 is then in abutment against the afore-mentioned first shoulder 80a and the lateral edges 82a of the stirrup 82 are in radial abutment against the radially outer face of the groove 80b.

The filtering element 60 is composed of the base 602 forming the radially outer part of the filtering element and comprising the afore-mentioned axial rib 60a.

One of the axial ends of the base 602 is connected to a handle 603 allowing the element 60 to be removed from the supports 80 after the head 86 of the screw 84 has been loosened.

This base 602 comprises, in the radially inner direction, a flow cavity 602a presenting a rectangular contour over the major part of the radially inner surface of the base 602. When the filtering element 60 is located in the lower part of the drum 16 as illustrated in FIG. 8, this cavity 602a is inclined in the direction of an evacuation opening 602b communicating with the first end 62a of the process conduit 62.

The flow cavity 602a is surmounted by a screen 604 supporting a filter gauze 606. This filter gauze 606 is sandwiched between the screen 604 and a frame 608 constituted by a rectangular border and a central transverse blade. In this way, this frame 608 defines two rectangular zones in axial direction.

The filter gauze 606 presents a porosity adapted to the product to be filtered and is made of stainless steel. This gauze 606 is welded between the frame 608 and the screen 604, with the result that tightness is ensured between these different elements.

A cylindrical sleeve 88 presenting a thickness equal to the sum of the thickness of the frame 608 and of the screen 604 extends the process conduit 62 in the direction of the evacuation opening 602b of the base 602 via an evacuation channel 602c.

Tightness is ensured by two O-ring joints 609 mounted in an annular groove made in the end surfaces of the cylindrical sleeve 88, on the one hand, opposite the vertical wall 16a of the drum, and, on the other hand, opposite the base 602, these O-ring joints 609 surrounding the process conduit 62.

O-ring joints 610 of rectangular shape ensure tightness of the filtering element 60, on the one hand, between the frame 608 and the drum 16 (vertical wall 16a, annular flange 16c and first shoulder 80a of the supports 80) and, on the other hand, between the screen 604 and the base 602.

It will therefore be understood that, when the drum 16 rotates continuously, each of the filtering elements 60, via the process conduits 62, and the connection openings 44a of the first disc 44, is successively located opposite the angular filtration slot 46a, the angular drying slot 46b and the angular cleaning slot 46c.

When the filtering element is in communication with the angular filtration slot 46a, the plutonium oxalate brought by pipe 24 arrives at the level of this filtering element 60 which, by means of the depression source 65, sucks the mother liquor while the solid elements remain blocked at the level of the filter gauze 606.

Then, when this filtering element 60 passes at the level of the angular drying slot 46b, the source of depression 66 for drying contributes to drying the solid deposit located on the filter gauze 606, while the supply of washing solution 68 rinses this solid deposit.

Finally, when the filtering element 60 reaches the level of the angular cleaning slot 46c, the supply of pulsed compressed air 64 ejects the cake thus constituted, separating it from the filter gauze 606 with a view to evacuating it via the collecting hopper 36.

Thus, the different arrangements of the filtration device according to the present invention, particularly the fact of effecting supply of liquid to be filtered inside the drum 16, the incorporation at the level of the walls of the drum 16 of pipes, the connecting system 40 constituted by the first and the second disc 44 and 46, as well as the incorporation of the filtering elements 60 within the very cylindrical wall 16b of the drum 16, contribute to forming a compact filtration device presenting reduced dimensions compatible with the parameters of safety-criticality of a device used for the reprocessing of products of the nuclear industry.

With a view to completing the ease of maintenance of this filtration device 10, a part of the drive shaft 18 fast with the drum is provided to be axially offset. To that end, the drive shaft 18 comprises two separable parts.

Rails then allow the axial displacement of the vessel 14/drum 16 assembly, this assembly being able to be rotated through 90° about a vertical axis thanks to rotating means in order to place the axis of the drum 16 parallel to the transverse direction of the glove box with the result that the gloves of the glove box allow access to the handle 603 of the filtering elements 60 with a view to replacing these filtering elements. To that end, the vessel is provided with an access trap on its front face turned in the direction opposite the drive shaft 18.

In order to monitor at each instant the position of the drum 60 and thus to know the position of each of the filtering elements 60 with respect to the angular slots 46a to 46d, and therefore to know the treatment undergone by each of the filtering elements 60, an optical angular detection system locating the angular position of the filtering elements 60 of the drum 16 is also provided.

What is claimed is:

1. Rotating device for continuously filtering a liquid such as a solution containing a precipitate, the device comprising:

a cylindrical, horizontal-axis drum of revolution, said drum having a rectangular longitudinal section with a vertical wall, a cylindrical wall and an axial opening defined by an annular flange extending the cylindrical wall, a drive system for rotating said drum, said drive system comprising a drive shaft coaxial and fast with said drum at the level of said vertical wall located on the side of the drum opposite said opening, a system for supplying liquid to be filtered, entering via said opening inside said drum, a plurality of filtering elements each disposed axially, forming at least a part of the cylindrical wall of the drum, said filtering elements each being connected to a process conduit through which a filtrate issued from the filtration of said liquid will pass, a system for evacuating the cake formed at the filtration of said liquid, a system for evacuating said filtrate passing through said process conduits and a hydraulic supply assembly, said hydraulic supply assembly comprising a pulsed compressed air supply and means forcing the passage of said liquid through the filtering elements, said means forcing the passage of said liquid through the filtering elements comprising a source of depression for filtration connected to said system for evacuation of the filtrate and placing the interior of said filtering elements under depression with respect to the interior of the drum a connecting system for communication between said supply assembly and said process conduits by allowing an angular distribution of the operations effected by said device, these operations comprising at least the filtration of the liquid and the separation of the cake from said filtering elements by cleaning, wherein said system for evacuating the cake functions by gravity and presents a collecting hopper located inside the drum substantially beneath the uppermost part and connected to a spout extending out of the drum via said opening, wherein said process conduits extend in said vertical wall of the drum and present, on the one hand, a first end opening out in a filtering element and, on the other hand, a second end opening out in the outer vertical face of said vertical wall, wherein said connecting system comprises a first disc fast with the drum about the drive shaft and pierced with a plurality of connection openings which are connected one by one to the second ends of said process conduits, and a second fixed disc coaxial with and adjacent said first disc and provided with angular slots in register with said supply assembly and disposed radially opposite said connection openings, an angular filtration slot being located at least partially in the lower part of the second disc and connected to said source of depression for the filtration of the liquid, and an angular cleaning slot being located substantially in the uppermost angular sector of the second disc and connected to said compressed air supply for the separation of the cake from each filtering element.

2. The filtration device of claim 1, wherein the cylindrical wall of said drum is provided with supports each oriented axially and distributed radially in regularly spaced manner, and each filtering element is removably mounted on said supports in order to line the whole cylindrical wall.

3. The filtration device of claim 2, wherein each filtering element is mounted to slide axially with respect to the supports and comprises a base, or shoe, defining a flow cavity covered, in the radially internal direction, by a filter gauze, the bottom of the cavity being inclined towards an opening for evacuation connected to the first end of the process conduit.

4. The filtration device of claim 2, wherein said drum comprises reversible blocking means for blocking each filtering element with respect to said supports.

5. The filtration device of claim 4, wherein the blocking means are adapted to place the filtering elements in radial abutment against the supports in the direction of the horizontal axis.

6. The device of claim 1, wherein the liquid supply system comprises a distributor which allows a substantially homogeneous distribution of the liquid to be filtered over the whole length of the filtering elements.

7. The device of claim 1, wherein said supply assembly comprises a source of depression for drying which generates a depression greater than the depression furnished by said source of depression for filtration and which is connected to the system for evacuating the filtrate, said second disc further comprises an angular slot for drying disposed between the angular slot for filtration and the angular slot for cleaning, and connected to said source of depression for drying.

8. The filtration device of claim 7, wherein said supply assembly further comprises a supply of washing solution for the cake opening out via said opening in the drum at the level of a rinsing nozzle adapted to direct the jet in the direction of at least one filtering element located radially opposite said angular slot for drying.

9. The device of claim 1, wherein said supply assembly further comprises a supply of washing solution for the filtering elements, connected to an angular slot for washing of the second disc, said angular slot for washing being located between the angular slot for cleaning and the angular slot for filtration, in order to allow, outside the periods of filtration, the cleaning of the filtering elements by the passage of said washing solution from said process conduits through said angular slot for washing in the direction of the corresponding filtering elements.

10. The device of claim 1, wherein it further comprises a system for applying said second disc against the first disc.

11. The filtration device of claim 10, wherein it further comprises a sealing disc placed coaxially against the second disc on the side opposite the first disc, said sealing disc being extended axially by a centering sleeve disposed between said drive shaft and said second disc, said second disc resting on the free end of said centering sleeve forming ball and socket joint and having the form of an annular portion of sphere, O-ring joints being placed between the said sealing disc and said drive shaft.

12. The device of claim 1, wherein said drum is placed in an outer vessel recovering the liquid possibly overflowing from said drum via said opening into said vessel in the direction of a pipe for emptying said vessel.

13. The filtration device of claim 12, wherein said vessel is mounted in an outer glove box allowing access to the filtering elements with a view to replacement thereof.

14. The filtration device of claim 13, wherein it further comprises means for displacing the drum which, outside the periods of filtration, make it possible to position at least certain of said filtering elements opposite at least one glove of said glove box.

15. The filtration device of claim 1, wherein it is intended for the filtration of a precipitate of plutonium oxalate in an acid solution, and the geometry of the filter is subcritical.

16. The filtration device of claim 15, wherein said supply assembly further comprises a supply of washing solution for the cake opening out via said opening in the drum at the level of a rinsing nozzle adapted to direct the jet in the direction of at least one filtering element located radially opposite said angular slot for drying and wherein said solution for washing the cake includes nitric acid.

* * * * *